Figure 1:
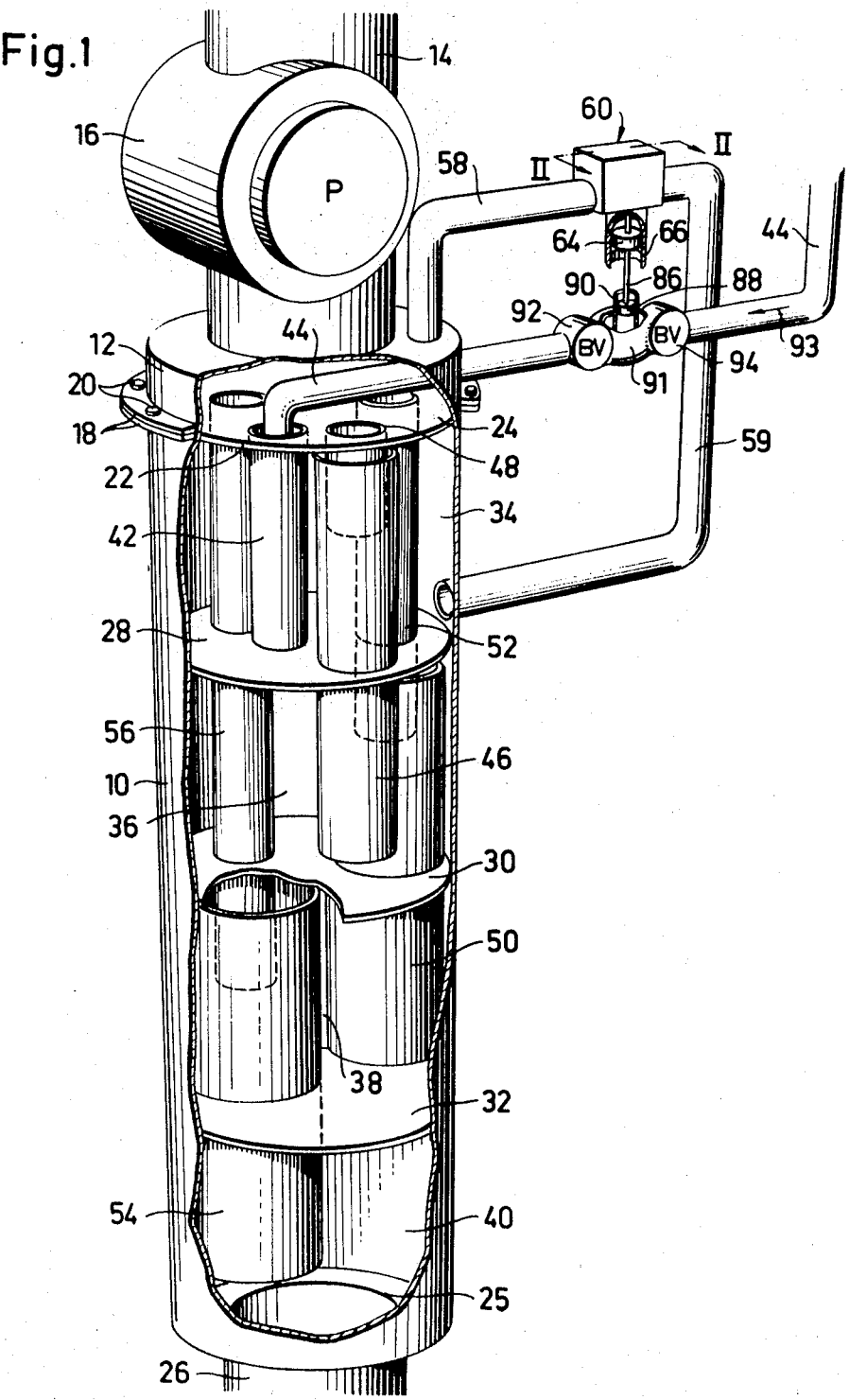

United States Patent

[11] 3,618,901

[72] Inventor Gustav Sindgren
    2 Ramsundsuagen, Bromma, Sweden
[21] Appl. No. 827,552
[22] Filed May 26, 1969
[45] Patented Nov. 9, 1971

[54] APPARATUS FOR PRODUCING A WATER GEL
    8 Claims, 2 Drawing Figs.
[52] U.S. Cl. .................................................. 259/4
[51] Int. Cl. ..................................................... B01f 15/02
[50] Field of Search .......................................... 259/4, 18,
    36, 60; 252/2

[56] References Cited
    UNITED STATES PATENTS
2,085,132  6/1937  Underwood .................. 259/4

| 2,312,639 | 3/1943 | Gronemeyer ................ | 259/4 |
| 3,089,683 | 5/1963 | Thomas ....................... | 259/4 |
| 3,361,412 | 1/1968 | Cole ............................. | 259/4 |

Primary Examiner—Robert W. Jenkins
Attorney—Sughrue, Rothwell, Mion, Zinn & Macpeak ABSTRACT: A container is divided into several mixing compartments connected for series flow by a plurality of tubes of progressively increasing diameter. Water is introduced into each but the first compartment by a supply tube concentric with the connecting tube. A gel-forming agent is pumped into the first compartment at a rate dependent on the difference between the water supply pressure and the pressure in the first compartment. The water gel mixture produced is progressively diluted in each mixing compartment.

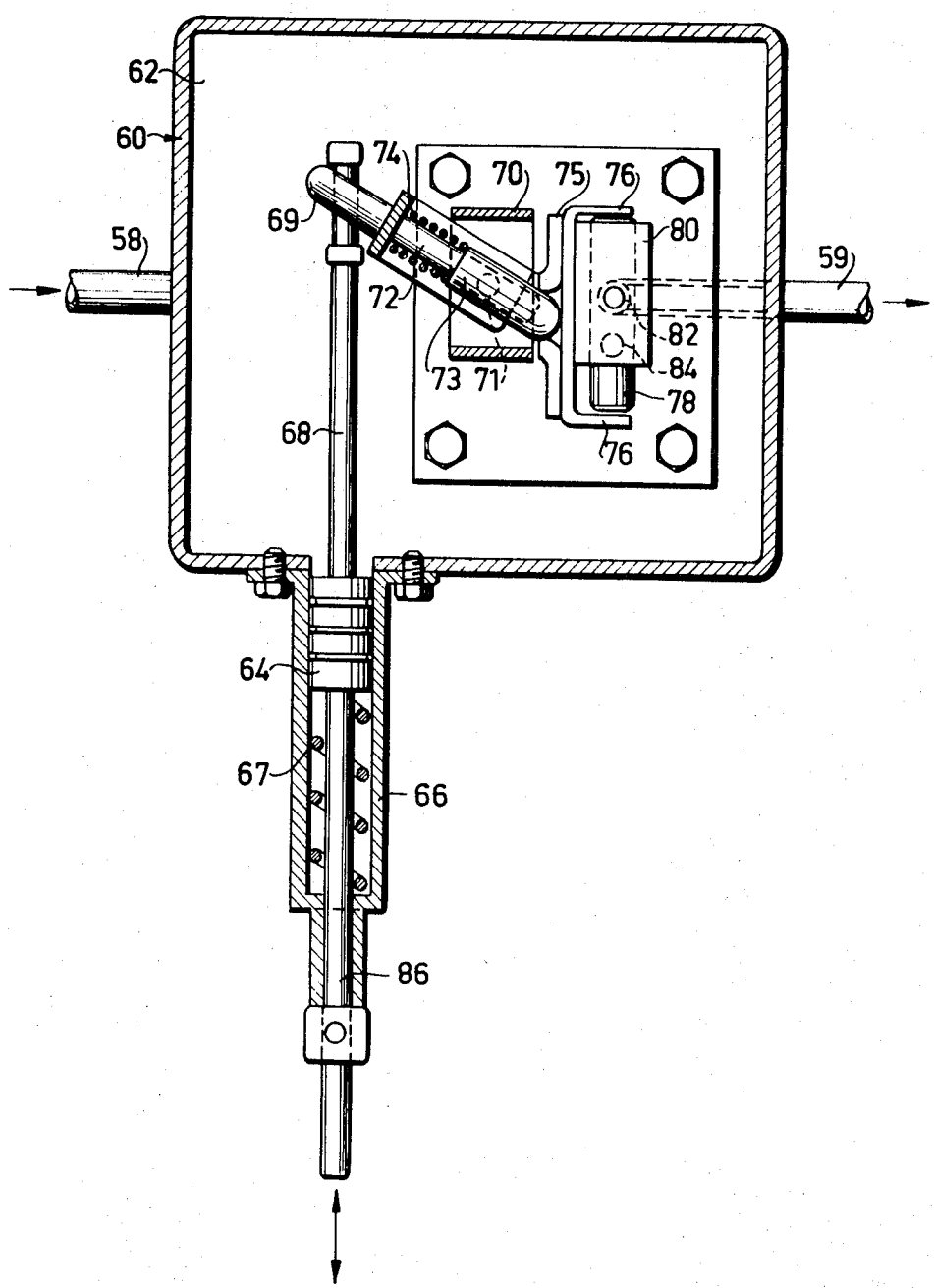

APPARATUS FOR PRODUCING A WATER GEL

This invention relates to an apparatus for producing a water gel.

More particularly this invention relates to an apparatus for producing a water gel consisting of water and a gel-forming agent and especially intended for extinguishing fire and for similar purposes. The water gel may be of the type prepared by mixing water to a gel-forming agent comprising a surface active compound which is not at all or at the utmost insignificantly soluble in water, and an organic compound of oil type. The two components of the gel-forming agent are preferably organic and are further volatile but, as a rule, in a lower degree than water. The amount of gel-forming agent in the water gel produced is less than 10 percent, preferably less than 5 percent, and is usually about 1 to 3 percent. Preferably, the surface active component consists of one or more polyethyleneoxide derivates, such as alkyl or aryl polyglycol esters, or a mixture of these compounds.

One main object of the invention is to reduce the time necessary for producing a fully satisfactory water gel to one or a few seconds, or a fraction of a second.

Another essential object of the invention is to provide an apparatus for producing water gel at the same rate as water is received from the waterwork system or by a pump thrown on a fire.

According to one main feature of the invention the water is supplied to the gel in several steps between which steps the mixture by agitation is brought into a turbulent flow until predetermined proportions of the two components have been reached.

Another characterizing feature of the invention is that the stepwise dilution of the gel-forming agent and the intermediate agitation of the mixture is performed in a continuous process.

An apparatus particularly suitable for carrying out the method of the invention has a plurality of tubes interconnected in series, a first of said tubes being connected to a source of gel-forming agent and all tubes arranged for separate communication with a supply of water in such a manner, that a mixture of gel-forming agent and water flows from tube to tube in a turbulent flow and with continuously increasing dilution with water of the mixture.

Further objects and advantages of the invention will become apparent from the following description, considered in connection with the accompanying drawings which form part of this specification and of which:

FIG. 1 a perspective and partly sectional view of an apparatus constructed according to the invention;

FIG. 2 a sectional view following line II—II of FIG. 1 and on an enlarged scale of a servo device for feeding gel-forming agent to the apparatus.

Referring now to the drawings and in particular FIG. 1, reference numeral 10 denotes an elongated, cylindrical casing to the end wall 12 of which is connected a pipe socket 14 housing a pump 16. The end wall 12 is a separate member, which by means of flanges 18 and screw joints 20 is attached to the cylindrical casing 10. Inside the end wall 12 a compartment 24 is formed by a partition wall 22, which compartment is in communication with the pressure side of the pump 16. The other end wall 25 of the casing is connected to a pipe socket 26, through which the produced gel is discharged for application to extinguish a fire or similar purpose, for instance, through a hose and nozzle.

The interior of the casing 10 in the embodiment shown is, between the partition wall 22 and the end wall 25, divided by means of three further partition walls 28, 30, 32 into four mixing compartments 34, 36, 38, 40 located axially in line one below the other. A tube 42 extends from the pressure compartment 24 and opens at some distance from the partition wall 28 into the first mixing compartment 34. A feed pipe 44 feeding a gel-forming agent and having a smaller outer diameter than the inner diameter of the tube 42 extends into the upper portion of said tube. A second tube 46 extends axially from the compartment 34 into the compartment 36 through the major part of said two compartments. Both ends of said tube 46 are open. A pipe 48 having a smaller diameter than the tube 46 extends from the chamber 24 for a short distance into the tube 46 coaxially with the latter. In the same manner a tube 50 interconnects the next following pair of compartments 36, 38, said tube having its open ends located at a short distance from the partitions 28 and 32, respectively. A pipe 52 having a smaller diameter than the tube 50 extends for a bit into this tube and extends upwardly into the compartment 24 without having any communication with the compartment 34. The lower edge of pipe 52 is concentric in relation to tube 50. In the embodiment shown in FIG. 1, a tube 54 connects the lower compartments 38, 40 in the same manner, the upper and lower edges of said tube being located at a distance from the partition wall 30 and the lower end wall 25, respectively. A pipe 56 extends from the chamber 24 through the partition walls 28, 30 without any communication with the compartments 34, 36 and opens coaxially with the tube 54 at a short distance under the upper edge of said tube. The tubes 42, 46, 50 and 54 have gradually increasing diameters.

Pipes 58, 59 connect the compartment 24 with the compartment 34. These pipes house a servo device which is generally denoted 60, for feeding of gel-forming agent through the pipe 44 from a storage container (not shown). The servo device 60 (see FIG. 2) is formed with a chamber 62 which is fed with water through the pipe 58 by the pressure prevailing within the compartment 24. The water pressure acts on a piston 64 mounted in a cylinder 66 against the action of a pressure spring 67. The piston supports a rod 68 acting upon a fork-shaped rocket 69 journaled in a holder 70 on trunnions 71. The rocker is provided with a central pin 72 on which a plunger 73 is axially displaceable against the action of a spring 74. The plunger 73 engages a socket 75 having two arms 76 gripping around the ends of a slide rod 78. The slide rod 78 is movable with sliding fit in axial direction in a fixedly mounted cylinder 80. This cylinder is formed with a port 82 which in the shown position is disconnected from the pipe 59 by the slide rod 78, but will be in connection with a bore 84 in the slide rod when the slide rod has moved to the opposite end position.

The piston 64 supports an additional rod 86 which is attached to a piston 88 movable in a cylinder 90 which is connected to pump housing 91 disposed in the feed pipe 44. The pump housing 91 is provided with two nonreturn valves 92, 94 permitting the gel-forming agent to flow in the pipe 44 solely in the direction indicated by the arrow 93.

The operation of the apparatus is as follows:

The pump 16 pumps water into the compartment 24 under a predetermined excess pressure corresponding to the desired capacity of the apparatus or the desired throwing distance of the produced water gel jet. The water pressure propagates via the pipe 58 into the chamber 62. The piston 64 has a greater area than the piston 88 and, thus, forces the latter downwards, viewed in the plane of the drawings, under compression of the spring 67. Hence, the amount of gel-forming agent present in the pump housing 91 is pushed via the valve 92 to the outlet opening of the pipe 44 opening into the tube 42. During the downward movement of the piston 64 the rocker 69 is actuated and the plunger 73 is advanced over the pin 72 under compression of the spring 74. At the end of the piston movement the rocker passes a dead point and is switched over to the opposite end position, the slide rod 78 being moved to connect the openings 82, 84 with one another. The chamber 62 is connected via the pipe 59 to the compartment 34, in which a lower pressure prevails than in the compartment 24. The pressure in the chamber 62 is reduced which permits the spring 67 to overcome the action of the pressure in said chamber and to move the piston 64 in upward direction. This movement causes movement of the pump piston 88 causing a further quantity of gel-forming agent to be sucked in through the valve 94. At the same time the rocker 69 is switched over to the position shown in the drawing. Thereafter the cycle of operation is repeated.

The means for feeding the gel-forming agent to the first tube 42 may be designed in various ways, the one described hereinbefore having the advantage that the pump device is dependent solely on the pressure difference between the compartments 24, 34 and thus not on the absolute water pressure in the apparatus. Further, the pump 88, 91 operates with a capacity that automatically responds to the variations of the water pressure in the compartment 24, thus maintaining the ratio of admixture of gel forming agent to the water at a constant value. The pump piston 88 feeds the gel-forming agent discontinuously but it is possible to operate the servo device at such an amplitude that the gel-forming agent is fed to the tube 42 in a more or less continuous flow.

In the tube 42 a first mixing of the gel-forming agent and water supplied from the compartment 24 is performed. The proportion of gel-forming agent to water may here be of the order of 1 to 10. In the tube 42 an agitation is effected, so that the intermixing of the two components is started. This mixing and agitating action is continued when the components flow out from the tube 42 and upwards into the larger compartment 34. During this flow a further blending of the two components will be brought about and result in a state which initially may have the character of an emulsion. The mixture then flows into the upper end of the tube 46 and flows down into the concentric space between the tube and the pipe 48 through which fresh water subjected to the pressure prevailing in the compartment 24 is admixed. During the continued downwardly directed flow in the tube 46 a mixing and stirring action is brought about which action is continued in the compartment 36, so that the concentration of the gel-forming agent is reduced to about 7 percent. The gel in progress of formation flows through the tube 50 down into the compartment 38 where a further dilution with water from the chamber 24 via the pipe 52 is effected. During a continued turbulent flow a dilution to, e.g., 5 percent of the gel-forming agent is effected. In the embodiment shown in the drawings a fourth addition of fresh water is effected when the almost finished water gel flows through the tube 54, which is fed with water via the pipe 56. In the compartment 40 the gel has the desired consistency having a content of gel-forming agent amounting to about 3 percent or even less.

According to the invention the conversion of the water into the gel state is effected by stepwise dilution of the gel under formation, which results in an excellent final product and at the same time reduces the time of production, so that it is possible to produce the gel at the same rate as the water is supplied from a main.

The casing 10 in FIG. 1 has been presented shortened in axial direction to fit to the size of the drawing. As a matter of fact the length of the different compartments 34, 36 etc. may be two or three times as large as shown in relation to the diameter of the casing.

As an alternative the pump 16 may be connected to the pipe socket 26, so that the water is sucked through the apparatus. The various tubes together with the corresponding mixing compartments may be arranged laterally side by side in a common casing instead of the one below the other as shown in FIG. 1. The diameters of the tubes may be adapted so that the velocity of flow of the components through the tubes will be at least approximately of the same magnitude.

While one more or less specific embodiment of the invention has been shown and described, it is to be understood that this is for purpose of illustration only, and that the invention is not to be limited thereby, but its scope is to be determined by the appended claims.

What I claim is:

1. An apparatus for producing a water gel consisting of water and a gel-forming agent, especially for fire extinguishing purposes, comprising:
    a. a container including means therein defining a plurality of compartments,
    b. a plurality of tubular means separately interconnecting each compartment in series with an adjacent compartment and having progressively increasing diameters from the first to the last compartments,
    c. means for introducing water under pressure into the first compartment,
    d. means for introducing water under pressure into each compartment except the first one comprising a plurality of tubes individually arranged substantially concentrically within each tubular means interconnecting adjacent compartments,
    e. means for introducing a gel-forming agent into the first compartment, and
    f. means for extracting the resulting water gel from the last compartment.

2. An apparatus as recited in claim 1 wherein the outlet end of the tubular means supplying a compartment is located below the inlet end of the tubular means draining the compartment, whereby the direction of fluid flow in the compartment is reversed to promote thorough mixing.

3. An apparatus as recited in claim 2 wherein the means for introducing a gel-forming agent is responsive to the difference between the water supply pressure and the pressure in the first one of the compartments.

4. An apparatus as recited in claim 1 wherein the means for introducing a gel-forming agent is responsive to the difference between the water supply pressure and the pressure in the first one of the compartments.

5. An apparatus for producing a water gel consisting of water and a gel-forming agent, especially for fire extinguishing purposes, comprising:
    a. a container including means therein defining a plurality of compartments,
    b. a plurality of tubular means separately interconnecting each compartment in series with an adjacent compartment,
    c. the outlet end of the tubular means supplying a compartment being located below the inlet end of the tubular means draining the compartment, whereby the direction of fluid flow in the compartment is reversed to promote thorough mixing,
    d. means for introducing water under pressure into each compartment,
    e. means for introducing a gel-forming agent into a first one of the compartments, and
    f. means for extracting the resulting water gel from a last one of the compartments.

6. An apparatus as recited in claim 5 wherein the means for introducing a gel-forming agent is responsive to the difference between the water supply pressure and the pressure in the first one of the compartments.

7. An apparatus for producing a water gel consisting of water and a gel-forming agent, especially for fire extinguishing purposes, comprising:
    a. a container including means therein defining a plurality of compartments,
    b. a plurality of tubular means separately interconnecting each compartment in series with an adjacent compartment,
    c. means for introducing water under pressure into each compartment,
    d. means for introducing a gel-forming agent into a first one of the compartments, said means being responsive to the difference between the water supply pressure and the pressure in the first one of the compartments, and
    e. means for extracting the resulting water gel from a last one of the compartments.

8. An apparatus for producing a water gel consisting of water and a gel-forming agent, especially for fire extinguishing purposes, comprising:
    a. a container including means therein defining a plurality of compartments,
    b. a plurality of tubular means separately interconnecting each compartment in series with an adjacent compartment, said tubular means having progressively increasing cross sections from the first to the last compartment, c. means for introducing a gel-forming agent into a first one of the compartments,
d. means for introducing water under pressure separately into said first compartment as well as into each of the following compartments to successively dilute the water gel, and
e. means for extracting the resulting water gel from a last one of the compartments.

* * * * *